United States Patent [19]

Timerman

[11] Patent Number: 5,401,074
[45] Date of Patent: Mar. 28, 1995

[54] HAIL PROTECTIVE VEHICLE COVER

[76] Inventor: Jerry L. Timerman, P.O. Box 4230, Woodland Park, Colo. 80866

[21] Appl. No.: 208,482

[22] Filed: Mar. 9, 1994

Related U.S. Application Data

[63] Continuation of Ser. No. 974,149, Nov. 10, 1992, abandoned.

[51] Int. Cl.6 ............................................. B60J 11/00
[52] U.S. Cl. ................................... 296/136; 296/95.1; 160/370.21
[58] Field of Search ............................... 296/136, 95.1; 160/370.2; 150/166, 168; 280/770; 52/222, 23, 3, 4, 63, 83, DIG. 13; 47/17 FM

[56] References Cited

U.S. PATENT DOCUMENTS

| 1,236,008 | 8/1917 | Rysdon | 52/3 X |
|---|---|---|---|
| 2,437,845 | 3/1948 | Wyeth | 296/95.1 X |
| 4,596,418 | 6/1986 | Koh . | |
| 4,612,967 | 9/1986 | Kamen et al. . | |
| 4,699,192 | 10/1987 | Kamen . | |
| 4,720,135 | 1/1988 | Farina | 296/136 |
| 4,799,728 | 1/1989 | Akers et al. | 296/136 |
| 4,825,889 | 5/1989 | Monteith | 296/136 X |
| 4,858,985 | 8/1989 | Wojcik | 296/136 |
| 4,867,216 | 9/1989 | McKee . | |
| 4,889,171 | 12/1989 | Minimo . | |
| 4,951,993 | 8/1990 | Taboada . | |
| 4,979,339 | 12/1990 | Jones et al. . | |
| 5,029,933 | 7/1991 | Gillem . | |
| 5,040,557 | 8/1991 | Morgan | 296/136 X |
| 5,088,788 | 2/1992 | Moulton . | |

FOREIGN PATENT DOCUMENTS

| 2524398 | 10/1983 | France | 296/136 |
|---|---|---|---|
| 2504948 | 8/1976 | Germany | 296/136 |
| 3512271 | 10/1986 | Germany | 296/136 |
| 25337 | 2/1977 | Japan | 296/136 |
| 155831 | 6/1990 | Japan | 296/136 |
| 585626 | 3/1977 | Switzerland | 296/136 |
| 2167719 | 6/1986 | United Kingdom | 296/136 |
| 1669776 | 8/1991 | U.S.S.R. | 296/136 |
| 94008813 | 4/1994 | WIPO | 296/136 |

OTHER PUBLICATIONS

Associated Press, "Car Shield Idea Strikes Pilot During Hailstorm" Jul. 23, 1992.

Primary Examiner—Robert J. Oberleitner
Assistant Examiner—Gary C. Hoge

[57] ABSTRACT

A vehicle cover that protects a vehicle from hail and other falling objects and is easily installed, removed, and stored in the trunk of the vehicle. The cover is substantially comprised of a sheet of cloth, several foam runners, and several attaching straps. The foam runners, preferably having a rectangular cross section, attach to the underside of the cloth. When placed on a vehicle, the foam runners support the cloth in a spaced apart relationship with the top of the vehicle. The attaching straps securely attach the cover to the vehicle by attaching to the wheel wells and the front and rear bumpers of the vehicle. The attaching straps hold the cloth in a taut condition so that the cloth remains in a spaced apart relationship with the top of the vehicle. Falling objects, such as hail, are repelled by the taut cloth and damage to the vehicle is prevented. The foam runners and straps are adjustable so that the cover fits a variety of vehicles.

14 Claims, 3 Drawing Sheets

HAIL PROTECTIVE VEHICLE COVER

This is a continuation of application Ser. No. 07/974,149, filed on Nov. 18, 1992, and entitled "Hail Protective Vehicle Cover", now abandoned.

BACKGROUND OF INVENTION

This invention relates generally to vehicle covers and more specifically to vehicle covers for protecting a vehicle from hail and other falling objects.

Hail is a precipitation which falls in the form of small balls or lumps consisting of ice and compact snow. Although it is generally small, hail has been reported to be as large as softballs. Almost half of the continental United states, from the rocky mountains to the east coast, is affected by hail.

Hail is very destructive when it is large and falls at a high rate of speed. In 1991, Colorado insurance companies paid a total of $1 billion for hail damage, a great deal of it attributable to automobile damage.

Protective car covers are well known in the art. However, few of the known protective car covers are capable of adequately protecting a vehicle from falling hail. Most car covers are designed to protect a vehicle from the sun, rain, snow, ice or the like. Some of these car covers do provide minimal protection from hail, but they either do not provide adequate protect from severe hail or are deficient in some other regard. Examples of patented protective covers are:

U.S. Pat. No. 5,029,933, entitled "Car Cover" issued to Gillem on Jul. 9, 1991 shows a car cover held tautby straps. This cover is not designed to protect a vehicle from hail. It only protects the front and rear windows from hail. The top of the car, the hood, and the trunk all have little or no protection from hail.

U.S. Pat. No. 4,951,993 entitled "Accordion Pleated Vehicle Cover" issued to Taboda on Aug. 28, 1990 shows a material folded like an accordion which extends over the top of a vehicle. This cover does not provide adequate protection from large hail that hits on the bottom of a crease. It is also large, unwieldy, and may not fit into a car's trunk.

U.S. Pat. No. 4,867,216 entitled "Sun and Snow Vehicle Cover" issued to McKee on Sep. 19, 1989 shows a car cover with raised portions spaced to prevent the rest of the cover from collapsing. Although this cover provides some protection from small hail, it is not designed to protect from hail and is therefore unlikely to adequately protect a vehicle from severe hail.

A car cover has been designed and manufactured by Jim Actor to specifically protect a vehicle from hail. This was reported by Associated Press on or about Jul. 23, 1992. This car cover is made of polymer plastic and UV-deflecting aluminum foil and weights 7 to 10 pounds. It attaches with several straps and forms a taut trampoline over a vehicle. It appears that this cover lays directly on the roof of the vehicle. This cover, however, must be custom made, is expensive, and it is unknown whether it provides adequate protection from severe hail.

Clearly, there exits a need for an improved vehicle cover for protecting vehicles from severe hail that is effective, easy to use, collapsible, foldable, fits in the trunk of a vehicle, and is adjustable to fit different vehicles.

SUMMARY OF INVENTION

The invention creates an effective vehicle cover that protects a vehicle from hail and other falling objects and is easily installed, removed, and stored in the trunk of a vehicle.

The cover is substantially comprised of a sheet of cloth, several foam runners, and several attaching straps. In the preferred embodiment, the foam runners have rectangular cross sections; but other shapes are also useful in this context. The foam runners attach to the underside of the cloth. When placed on a vehicle, the foam runners support the cloth in a spaced apart relationship with the top of the vehicle. The attaching straps securely attach the cover to the vehicle by attaching to the wheel wells and the front and rear bumpers of the vehicle.

The attaching straps hold the cloth in a taut condition so that the cloth does not sag between the foam runners and contact the vehicle. Falling objects, such as hail, are repelled by the taut cloth and damage to the vehicle is prevented. The foam runners are adjustable so that the cover can fit a variety of vehicles.

Note that the protecting cloth is spaced apart from the vehicle. Contact with the vehicle is by the foam runners only. The foam runners should hail directly impact it via the cloth, permits compression to further protect the vehicle.

The cloth portion is substantially rectangular. It is slightly longer and slightly wider than the target vehicle and therefore substantially covers the target vehicle. It covers only the top portion of a vehicle and preferably does not extend down the sides of a vehicle. This does not diminish the cover's hail protective quality because, due the physical characteristics of hail, very little damage is done to the sides of vehicles.

The preferred embodiment uses a nylon mesh or nylon netting material for the cloth portion. This material has the necessary strength while still being lightweight and foldable.

The rectangular foam runners lay across the width of the vehicle. The preferred embodiment uses four foam runners placed at appropriate positions such that the cloth portion is held above the vehicle and does not touch the vehicle. The foam runners are slightly longer than the width of the target vehicle.

In the preferred embodiment, the foam runners are removably attached to the cloth portion with hook and loop fasteners, commonly known by the trademark VELCRO. Other attachment means are obvious to those of ordinary skill in the art. The position of the foam runners relative to the cloth portion are adjustable so that the cover fits a variety of vehicle body shapes.

In the preferred embodiment, the cover has eight attaching straps. There are two straps on the front and rear of the cover and two straps on both sides of the cover. The straps on the sides attach to the wheel wells of the vehicle. The front and rear straps attach to the front and rear bumpers or other suitable attachment points. The straps are non-mar and do not damage the vehicle. The straps are adjustable and have a hook at one end to attach to the vehicle. The hooks are also non-mar and will not damage the vehicle.

The non-mar characteristics, adjustability, and hooks used in the straps may be of a variety of materials and shapes well known to those of ordinary skill in the art.

Several embodiments of the invention are illustrated in the figures and described more fully below.

DETAILED DESCRIPTION OF THE DRAWINGS

Figure 1:
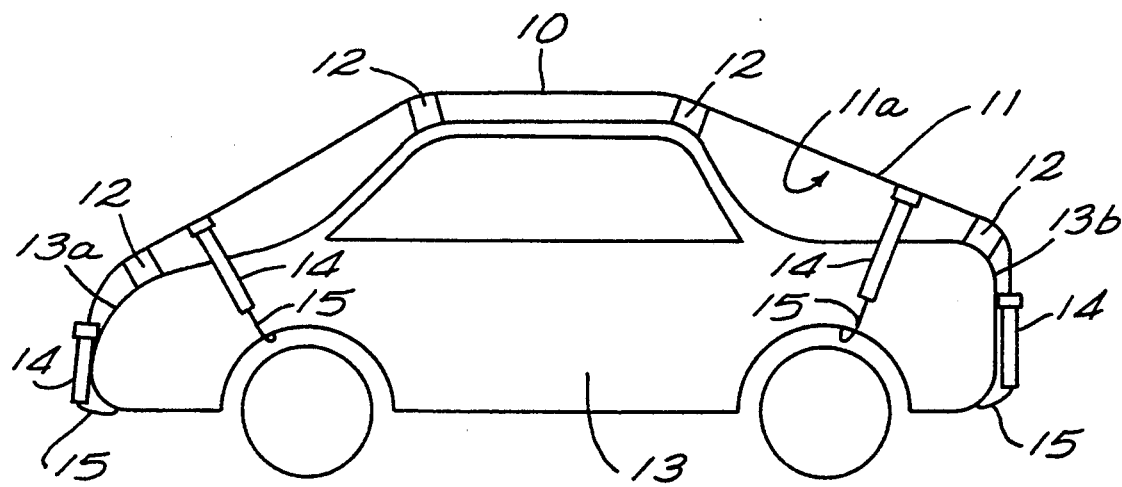
FIG. 1 shows a side view of the preferred embodiment of the invention attached to and covering a vehicle.

FIG. 1 shows a side view of the preferred embodiment of the invention attached to a vehicle.

The vehicle cover 10 is comprised of a cloth portion 11, foam runners 12, straps 14, and attaching means 15. The cloth portion 11 is supported by the rectangular foam runners 12 and is held taut by straps 14 and attaching means 15. Cloth portion 11 extends substantially from the front 13a of the vehicle 13 to the rear 13b of the vehicle 13. Because the cloth portion 11 is taut, it does not sag between the supporting foam runners 12 and does not contact the vehicle 13. Pockets 16 are formed between cloth portion 11 and vehicle 13. Since cloth portion 11 does not contact vehicle 13, falling hail "bounces" off without damaging vehicle 13.

Cloth portion 11 is substantially rectangular and does not extend down the sides of vehicle 13. This does not substantially interfere with the cover's effectiveness because, due to the size and trajectory of hail, very little damage occurs to the sides of vehicles.

Cloth portion 11 can be made from a variety of materials. The preferred embodiment uses nylon mesh or nylon netting material. This material is strong enough to be held taut and repel falling objects. Those of ordinary skill in the art readily see that many other materials exist which are suitable for making the cloth portion 11 including, but not limited to, flaccid materials made from cotton, plastics, and other natural and man-made materials.

The preferred embodiment uses a cloth portion 11 which is slightly wider and slightly longer than the target vehicle and therefore substantially covers the target vehicle.

Foam runners 12 support the cloth portion 11 above the upper portion of vehicle 13. The preferred embodiment uses four foam runners 12 positioned as shown. The foam runners are rectangular and extend from one side of the vehicle 13 to the other side. The preferred embodiment uses foam runners which are approximately five inches high, five inches wide, and slightly longer than the width of the target vehicle.

In the preferred embodiment, the foam runners 12 are made of closed cell foam rubber material. The closed cell foam rubber provides sufficient support for the cloth portion 11, flexes to fit different vehicles, and does not mar the finish of the vehicle 13. Those skilled in the art readily see that other similar materials can be used in place of closed cell foam rubber to make the foam runners 12.

The foam runners 12 are removably attached to the interior side 11a of cloth portion 11. The foam runners 12 are also adjustable in that they are repositionable to different positions on the cloth portion 11. This allows cover 10 to be adjusted to fit a variety of vehicle body shapes.

The preferred embodiment uses "hook and loop" fasteners (not shown), commonly referred to by the trademark VELCRO, to removably attach the foam runners 12 to the cloth portion 11.

Straps 14 and attaching means 15 secure cover 10 to vehicle 13. Straps 14 are adjustable in length and are a non-mar type (i.e. made of non-metallic, plastic, rubber, or other non-marring materials).

Straps 14 are attached to vehicle 13 by attaching means 15. The preferred embodiment uses non-marring hooks either made of plastic or covered with plastic for the attaching means 15.

The preferred embodiment uses eight straps 14 and eight attaching means 15 to hold cover 10 to vehicle 13. One strap 14 and one attaching means 15 attach to each wheel well of vehicle 13. Two straps 14 and two attaching means 15 attach to the front 13a of vehicle 13 and two straps 14 and two attaching means 15 attach to the rear 13b.

Figure 2:
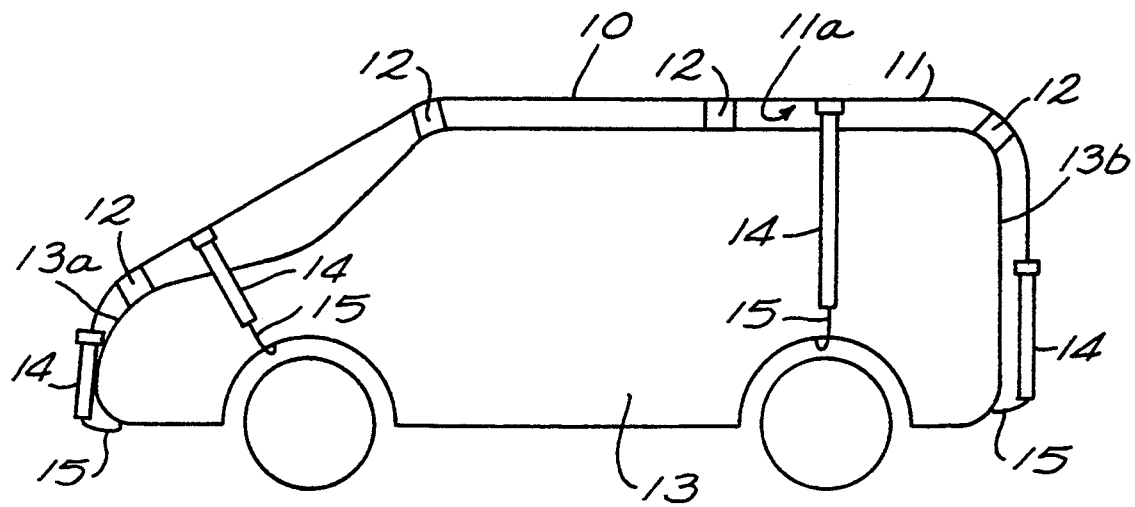
FIG. 2 shows a side view of the invention attached to sport utility or station wagon type vehicle.

FIG. 2 shows the invention attached to a sport utility or station wagon type vehicle and also demonstrates how the invention is adaptable to a variety of vehicle shapes.

Cloth portion 11 is supported by foam runners 12 which are positioned such that cloth portion 11 is held in a spaced apart relationship to the top of vehicle 13.

Straps 14 and attaching means 15 attach to the vehicle 13. The preferred embodiment uses eight straps 14 and eight attaching means 15. Depending on the size of the vehicle more or fewer straps and attaching means are used.

Straps 14 and attaching means 15 attach to the front 13a, the rear 13b, to the wheel wells of the vehicle 13.

Figure 3:
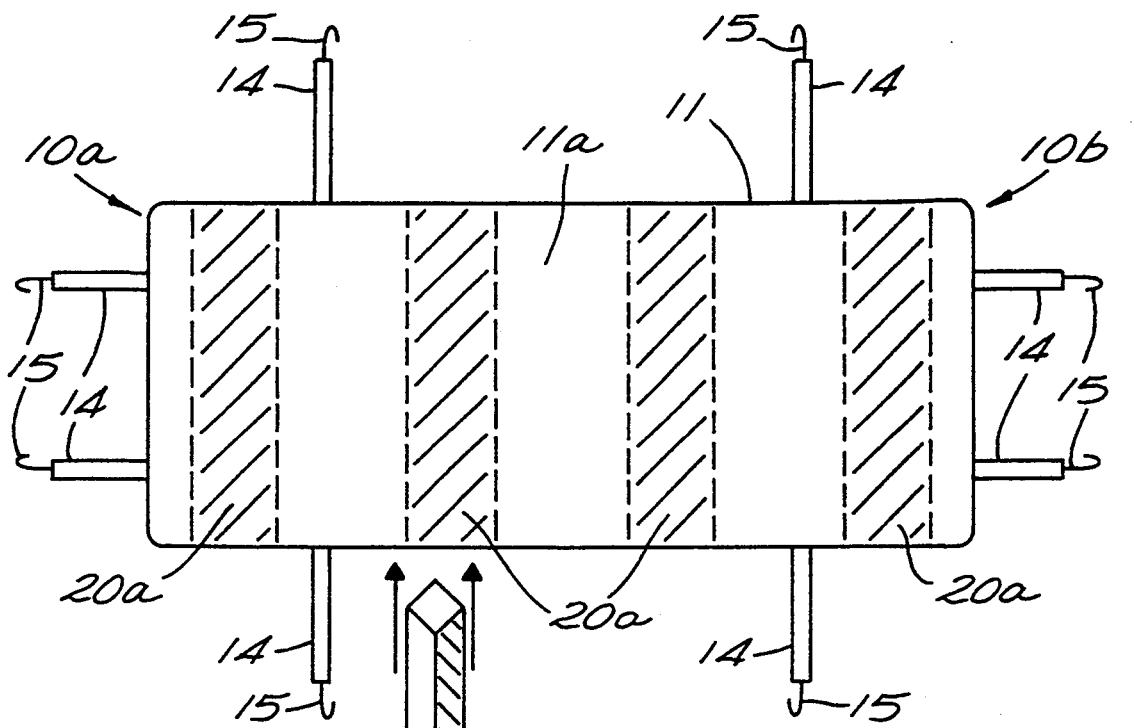
FIG. 3 shows the preferred embodiment of the invention laid flat with the foam runners detached from the cloth portion.

FIG. 3 shows the preferred embodiment of the invention laid flat with the interior surface 11a of cloth portion 11 shown. A foam runner 12 is shown detached from the cloth portion 11.

FIG. 3 also shows the arrangement of the adjustable fasteners 20a and 20b on the cloth portion 11 and the foam runners 12.

Cloth portion 11 is substantially rectangular. Straps 14 are attached to cloth portion 11. Attaching means 15 are attached to straps 14. Straps 14 and attaching means 15 are all non-mar as described above.

The preferred arrangement of the cloth mounted adjustable fasteners 20a is shown by the cross hatch area on the cloth portion 11. The runner mounted adjustable fasteners 20b are shown mounted on one side of the foam runner 12. The preferred embodiment uses hook and loop fasteners.

The cloth mounted adjustable fasteners 20a are wider than the runner mounted adjustable fasteners 20b. This allows the foam blocks 12 to be mounted on the cloth portion 11 so that the cover is easily adjusted to fit a specific vehicle. Foam blocks 12 are easily moved toward the front of the cover 10a or toward the rear of the cover 10b as needed to fit a specific vehicle.

In an alternate embodiment, the foam runners 12 are wider than the cloth portion 11. This embodiment allows the foam runners to protrude further beyond the edge of the cloth portion 11. This embodiment provides increased support for the edge of the cloth portion 11.

Figure 4:
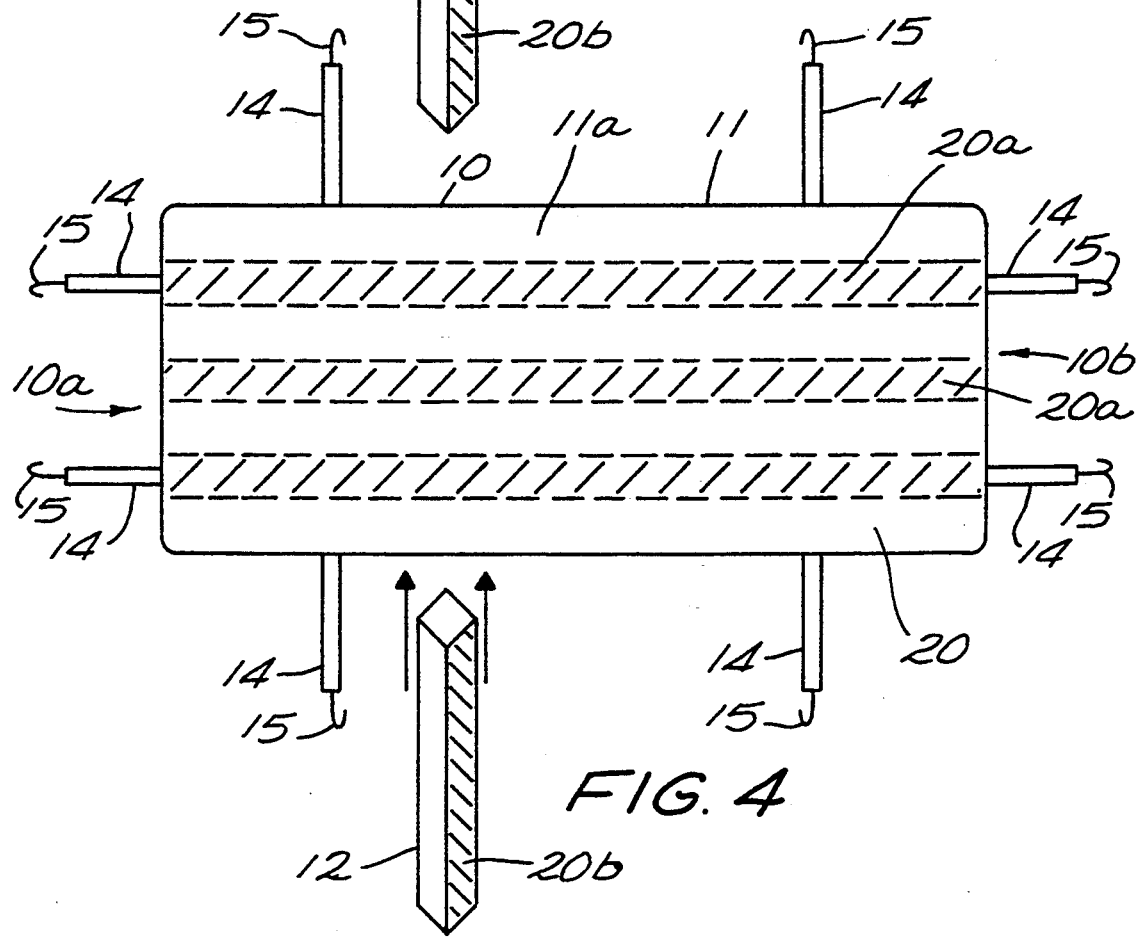
FIG. 4 shows an alternate embodiment of the invention with the foam runners detached from the cloth portion.

FIG. 4 shows an alternate embodiment of the invention with the foam runners 12 detached from the cloth portion 11. The cover 10 is shown with the interior surface 11a of the cloth portion 11 showing. The cloth portion 11, straps 14, and attaching means 15 are the same as in FIG. 3 above.

The cloth mounted adjustable fasteners 20a are shown in an alternate configuration. In this embodiment, three strips of the adjustable fasteners 20a extend from the front of the cover 10a to the rear of the cover 10b. The runner mounted adjustable fasteners 20b are mounted on the foam runners 12 as in the previous embodiment.

This configuration allows the removable foam runners 12 to be attached to any position on the cloth portion 11. This configuration also allows the cover 10 to be easily adjustable to many different vehicle shapes.

In this embodiment as well, the foam runners extend perpendicular across cover 10.

Figure 5:
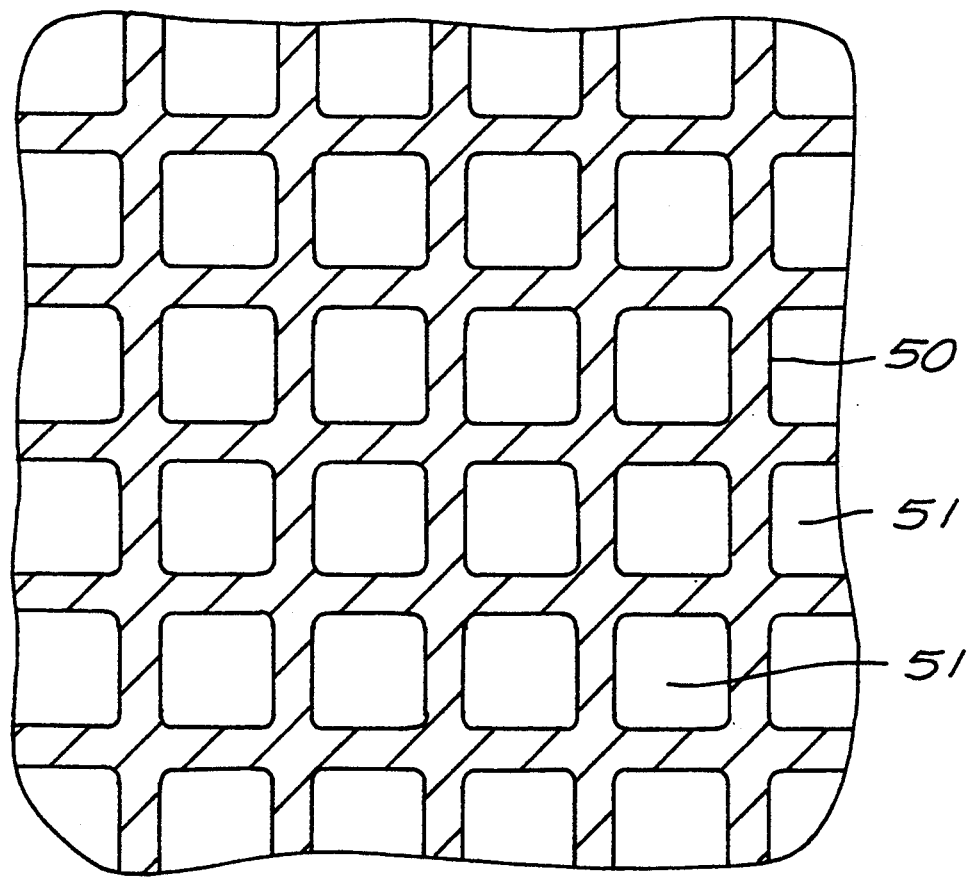
FIG. 5 shows an enlarged section of netting material suitable for use as the cloth portion of the invention.

FIG. 5 shows an enlarged section of netting material suitable for use as the cloth portion of the invention.

Netting 50 has holes or openings 51 through which air and water can pass. Holes or openings 51 are small enough to prevent damaging hail from falling through them. There is no minimum size for the holes or openings 51.

The use of netting 50 for the cloth portion is advantageous for several reasons. First, the holes or openings 51 allow wind and rain to pass through the netting 50. Wind is therefore less likely to dislodge the invention from the vehicle and rain is less likely to be caught and weight down the cloth portion.

A variety of materials are suitable for use as netting 50. The preferred embodiment uses nylon netting or nylon mesh material. This material is strong enough to be held taut and to repel falling objects such as hail. Those of ordinary skill in the art readily recognize many other materials suitable for making the invention including, but not limited to, netting made of cotton, plastics, and other natural and man-made materials.

It is clear from the foregoing that the present invention represents a new and useful apparatus for protecting a vehicle from hail damage.

What is claimed is:

1. A protective car cover for protecting a car from hail comprising:
   a) a netting portion having an exterior surface and an interior surface, said netting being made of substantially non-absorbent material, said netting portion having a first and second attachment strip extending substantially from a first end thereof to an opposite second end of the interior surface;
   b) a plurality of runners being attachable to, and at substantially right angle to said first and second attachment strips;
   c) a plurality of attaching straps each having a first end and a second end, each first end being attached to a peripheral portion of said netting portion; and,
   d) a plurality of attachment means for securing to a vehicle, each attachment means attached to one of said second ends of said attaching straps.

2. The car cover according to claim 1 further including a plurality of mating strips, each mating strip connected to one of said runners for attaching said runner to said first and second attachment strip.

3. The car cover according to claim 2 wherein said plurality of runners are constructed of closed cell foam rubber.

4. The car cover according to claim 2 wherein said netting portion is substantially as large as a top of a selected vehicle.

5. The car cover according to claim 4 wherein said plurality of attaching straps have elastic characteristics.

6. A hail protection apparatus for a vehicle comprising:
   a) a netting portion having an exterior surface and an interior surface, said netting having a first and second attachment strips extending substantially from a first end thereof to an opposite second end of the interior surface;
   b) at least four runners, each of said runners being attachable to said first and second attachment strips; and,
   c) a plurality of attaching straps each having a first end and a second end, each first end being attached to a peripheral portion of said netting portion, said second end being attachable to a vehicle.

7. The protector according to claim 6 further including a plurality of mating strips, each mating strip connected to one of said runners for attaching said runner to said first and second attachment strip.

8. The protector according to claim 7 wherein said plurality of runners are constructed of closed cell foam rubber.

9. The protector according to claim 8 wherein said netting portion is substantially as large as a top of a selected vehicle.

10. The car cover according to claim 9 wherein said plurality of attaching straps have elastic characteristics.

11. A stationary car combination comprising:
   a) a car having a top side, said car being parked; and,
   b) a protective car cover for protecting said car and having,
      1) a flexible netting portion having an exterior surface and an interior surface, said netting being made of substantially non-absorbent material, said cloth portion having a first and second attachment strip extending substantially from a first end thereof to an opposite second end,
      2) a plurality of closed celled foam runners being attachable to said first and second attachment strips and at substantially right angles to said first and second attachment strips,
      3) a plurality of attaching straps each having a first end and a second end, each first end being attached to a peripheral portion of said netting portion, and,
      4) a plurality of attachment means for securing to a vehicle, each attachment means connected to one of said second ends of said attaching straps.

12. The combination according to claim 11 further including a plurality of mating strips, each mating strip connected to one of said runners for attaching said runner to said first and second attachment strip.

13. The combination according to claim 12 wherein said netting portion is substantially as large as a top of said car.

14. The combination according to claim 13 wherein said plurality of attaching straps have elastic characteristics.

* * * * *